United States Patent [19]

Cogswell et al.

[11] Patent Number: 5,019,450

[45] Date of Patent: * May 28, 1991

[54] FIBER REINFORCED COMPOSITIONS AND METHOD OF PRODUCING SUCH COMPOSITIONS

[75] Inventors: Frederic N. Cogswell, Welwyn Garden City; David J. Hezzell, Biggleswade; Peter J. Williams, Barton-le-Clay, all of England

[73] Assignee: Imperial Chemical Industries PLC, London, England

[ * ] Notice: The portion of the term of this patent subsequent to Dec. 17, 2002 has been disclaimed.

[21] Appl. No.: 401,488

[22] Filed: Aug. 30, 1989

Related U.S. Application Data

[60] Continuation of Ser. No. 133,237, Dec. 14, 1987, abandoned, which is a continuation of Ser. No. 804,114, Dec. 3, 1985, abandoned, which is a division of Ser. No. 537,713, Sep. 30, 1983, Pat. No. 4,559,262, which is a continuation of Ser. No. 341,186, Jan. 20, 1982, abandoned.

[30] Foreign Application Priority Data

Jan. 21, 1981 [GB] United Kingdom ................ 8101821
Jul. 28, 1981 [GB] United Kingdom ................ 8123160
Nov. 17, 1981 [GB] United Kingdom ................ 8134597

[51] Int. Cl.$^5$ .............................................. B32B 5/08
[52] U.S. Cl. .................................... 428/402; 428/294
[58] Field of Search ................................ 428/402, 407

[56] References Cited

U.S. PATENT DOCUMENTS

| | | | |
|---|---|---|---|
| 3,164,563 | 1/1965 | Maxwell et al. | 524/494 X |
| 3,822,177 | 7/1974 | Moked | 428/402 X |
| 4,037,011 | 7/1977 | Hattori et al. | 428/402 X |
| 4,559,262 | 12/1985 | Cogswell et al. | 428/407 |

FOREIGN PATENT DOCUMENTS

1264432 2/1972 United Kingdom .

*Primary Examiner*—Alexander S. Thomas
*Attorney, Agent, or Firm*—Cushman, Darby & Cushman

[57] ABSTRACT

Fiber-reinforced structures comprising a thermoplastics polymer and containing at least 30% by volume of reinforcing filaments extending longitudinally of the structure which have been produced in a continuous process and which have exceptionally high stiffness. The exceptionally high stiffness results from thorough wetting of the reinforcing filaments by molten polymer in the continuous process. The thorough wetting gives rise to a product which can be further processed even in vigorous mixing processes such as injection moulding with surprisingly high retention of the fiber length in the fabricated article. The continuous processes for producing the reinforced structures employ thermoplastics polymers having lower melt viscosities than conventionally considered suitable for achieving satisfactory physical properties.

7 Claims, No Drawings

FIBER REINFORCED COMPOSITIONS AND METHOD OF PRODUCING SUCH COMPOSITIONS

This is a continuation of application Ser. No. 07/153,237, filed Dec. 14, 1987, which was abandoned upon filing hereof which wherein, is a continuation of Ser. No. 06/804,114, filed Dec. 3, 1985 abandoned which is a division of Ser. No. 06/537,713, filed Sept. 30, 1983 now U.S. Pat. No. 4,559,262 which is a continuation of Ser. No. 06/341,186 filed Jan. 20, 1982 abandoned.

This invention relates to fibre-reinforced compositions containing thermoplastics resins and to methods of producing such compositions.

Processes are known in which a fibre-reinforced structure is produced by pulling a tow or roving of glass fibres through a bath of low viscosity thermosettable resin to impregnate the fibres. The structure is subsequently cured by heating. Such processes are known as pultrusion processes. Although such processes have been known for at least 10 years they have not been used commercially to any extent for the production of thermoplastics resin impregnated structures. This is because of difficulties experienced in wetting the fibres when they are pulled through the viscous molten resin. The resulting products have unacceptable properties as a result of this poor wetting.

The efficiency of a particular process in wetting the fibres and thereby providing the basis for making maximum use of the very high levels of physical properties inherent in continuous fibres, such as glass fibres, may be assessed by measuring the extent to which the process provides a product having a flexural modulus approaching the theoretically attainable flexural modulus.

The theoretically attainable flexural modulus is calculated using the simple rule of mixtures:

$$E_L = V_f E_f + V_m E_m$$

where $E_L$ is the longitudinal modulus of the composition,
$V_f$ is the volume fraction of fibre,
$E_f$ is the flexural modulus of the fibre,
$V_m$ is the volume fraction of the matrix polymer,
$E_m$ is the flexural modulus of the matrix polymer.

The use of melts of conventional high molecular weight thermoplastics for impregnating continuous rovings does not permit a high level of flexural modulus to be obtained. For example, U.S. Pat. No. 3 993 726 discloses an improved process of impregnating continuous rovings under high pressure in a cross-head extruder, pulling the rovings through a die and cooling and shaping the rovings into a void-free shaped article. Products obtained using polypropylene are shown in Example 1 to have a flexural modulus of only about 6GN/m$^2$, for a glass fibre content of 73% by weight, that is, less than 20% of the theoretically attainable value.

It has now been found possible to produce materials having flexural modulus levels which approach the theoretically attainable levels.

Accordingly, there is provided a fibre-reinforced structure comprising a thermoplastics polymer and reinforcing filaments characterised in that the structure has been produced by a continuous process and contains at least 30% by volume of the structure of reinforcing filaments extending longitudinally of the structure and the flexural modulus of the structure determined by ASTM D790-80 is at least 70% and preferably at least 90% of the theoretically attainable flexural modulus. The interlaminar shear strength of these structure is in excess of 10 MN/m$^2$ and preferably in excess of 20 MN/m$^2$. The preferred thermoplastic polymers for use in the invention are crystalline polymers having a melting point of at least 150° C. and amorphous polymers having a glass transition temperature of at least 25° C. For optimum stiffness the thermoplastic polymer should have a flexural modulus of at least 1 GN/m$^2$ and preferably at lest 1.5 GN/m$^2$.

Fibre reinforced structures according to the invention can be produced by a variety of processes which enable good wetting of continuous, aligned, fibres to be achieved. In one of these processes there is provided a process of producing a fibre-reinforced composition comprising drawing a plurality of continuous filaments through a melt of a thermoplastics polymer having a melt viscosity of less than 30 Ns/m$^2$, preferably between 1 and 10 Ns/m$^2$, to wet the filaments with molten polymer, the filaments being aligned along the direction of draw. Optionally, the impregnated filaments may be consolidated into a fibre-reinforced polymer structure. The viscosity of thermoplastics varies with shear rate decreasing from a near constant value at low shear. In this application we refer to the viscosity at low shear rates (usually referred to as the Newtonian viscosity). This is conveniently measured in a capillary viscometer using a die 1 mm in diameter and 8 mm long, the melt viscosity being determined at a shear stress in the range 10$^3$–10$^4$ N/m$^2$.

Surprisingly, despite the fact that such a polymer is of lower molecular weight than normally considered suitable in the thermoplastics polymer field for achieving satisfactory physical properties the reinforced compositions have exceptionally good physical properties. Thus when reinforced thermosetting polymer compositions are produced by a pultrusion process the viscosity of the thermosetting prepolymer resin in the impregnation bath is typically less than 1 Ns/m$^2$ for good wetting of the fibre. This low value of viscosity may be used because the prepolymer is subsequently converted to a solid form by a heat curing process. By contrast thermoplastics polymers are normally fully polymerised solid materials and are only obtained in liquid form by heating the thermoplastics polymer to melt it. However, the melt viscosity of conventional high molecular weight polymers having acceptable physical properties is usually in excess of 100 Ns/m$^2$. Adequate wetting of the fibres in a pultrusion process with a melt of such high viscosity is not possible. Whilst it is possible to reduce melt viscosity to some extent by increasing the melt temperature it is normally the case that an insufficient reduction in viscosity is obtainable below the decomposition temperature of the thermoplastics polymer.

The use of a thermoplastics polymer of low enough molecular weight to give a sufficiently low melt viscosity to result in adequate fibre wetting in a pultrusion process surprisingly gives a product of high strength.

Accordingly there is also provided a fibre-reinforced thermoplastics composition characterised in that it has been obtained by drawing a plurality of continuous filaments through a melt of the thermoplastics polymer having a melt viscosity of less than 30 Ns/m$^2$ and preferably between 1 and 10 Ns/m$^2$ to wet the filaments with molten polymer, the filaments being aligned in the direction of draw. The fibre-reinforced structure produced should have a void content of less than 15% and preferably less than 5%.

By, the term "continuous fibres" or "plurality of continuous filaments" is meant any fibrous product in which the fibres are sufficiently long to give a roving or tow of sufficient strength, under the processing conditions used, to be hauled through the molten polymer without the frequency of breakage which would render the process unworkable. Suitable materials are glass fibre, carbon fibre, jute and high modulus synthetic polymer fibres. In the latter case it is important that the polymer fibres conform to the proviso of having sufficient strength to be capable of being hauled through the polymer melt without breakage disrupting the process. In order to have sufficient strength to be hauled through the impregnation system without breakage the majority of the continuous fibres of the fibrous product should lie in one direction so that the fibrous product can be drawn through molten polymer with the majority of the continuous fibres aligned. Fibrous products such as mats made up of randomly disposed continuous fibrous are not suitable for use in the invention unless they form part of a fibre structure in which at least 50% by volume of the fibres are aligned in the direction of draw.

The continuous fibres may be in any form having sufficient integrity to be pulled through the molten polymer but conveniently consist of bundles of individual fibres or filaments, hereinafter termed "rovings" in which substantially all the fibres are aligned along the length of the bundles. Any number of such rovings may be employed In the case of commercially available glass rovings each roving may consist of up to 8000 or more continuous glass filaments. Carbon fibre tapes containing up to 6000 or more carbon fibres may be used. Cloths woven from rovings are also suitable for use in the present invention. The continuous fibres may be provided with any of the conventional surface sizes, particularly those designed to maximise bonding between the fibre and the matrix polymer.

In order to achieve the high levels of flexural modulus possible by use of the invention it is necessary that as much as possible of the surfaces of the continuous fibres are wetted by the molten polymer. Thus where a fibre consists of a plurality of filaments the surfaces of the individual filaments making up the fibre must be wetted for optimum effect. Where the filament is treated with a surface size or anchoring agent the polymer will not be in direct contact with the surface of the fibre or filament because the size is interposed. However, providing that good adhesion between the fibre and the size and between the size and the polymer are achieved the product of the invention will have a high flexural modulus and the size will, in general, enhance the properties obtained.

The thermoplastics polymer employed in the process hereinbefore described may be any polymer which will melt to form a coherent mass providing that the melt has a viscosity of less than 30 $Ns/m^2$ and preferably less than 10 $Ns/m^2$. In order to achieve acceptable physical properties in the reinforced composition it is preferred that the melt viscosity should be in excess of 1 $Ns/m^2$. As indicated the choice of a polymer in the required melt viscosity range is primarily dictated by the molecular weight of the polymer. Suitable polymers include thermoplastics polyesters, polyamides, polysulphones, polyoxymethylenes, polypropylene, polyarylene sulphides, polyphenylene oxide/polystyrene blends, polyetheretherketones and polyetherketones. A variety of other thermoplastics polymers can be used in the process of the invention although polymers such as polyethylene will not give compositions of such high strength.

In the process of impregnating the fibres of the roving, in addition to using a polymer of suitable melt viscosity to bring about adequate wetting it is necessary to maximise penetration of the melt into the roving. This may be done by separating, as far as possible, the rovings into the individual constituent fibres, for example, by applying an electrostatic charge to the roving prior to its entry into the molten polymer or preferably by spreading the roving whilst it is in the molten polymer to separate the constituent filaments. This is conveniently achieved by passing the roving under tension over at least one, and preferably several, spreader surfaces. Further enhancement of wetting occurs if further work is applied to the separated, polymer impregnated, fibres, for example, by consolidating the separated fibres by pulling the impregnated roving from the melt through a die. This die may have the profile desired of the impregnated roving or the impregnated roving may be passed through a further sizing die whilst the polymer is still flowable. Surprisingly, it is advantageous if this die is cooled in order to achieve satisfactory sizing and a smooth passage through the die. When the impregnated rovings emerge from the bath in the form of a flat sheet further work may be applied by passing the sheet between a pair of rollers.

The rate at which the roving can be hauled through the impregnation bath is dependent on the requirement that the individual fibres should be adequately wetted. This will depend, to a large extent on the length of the path through the molten polymer bath and in particular the extent of the mechanical spreading action to which the roving is subjected in the bath. The rates achievable in the present process are at least comparable with the rates achievable in thermoset pultrusion processes because the latter process is restricted by the time required to complete necessary chemical reactions after the impregnation stage.

In a preferred embodiment the spreader surfaces over which the rovings are pulled to provide separation of the rovings are provided with an external heat input to heat the spreader surface a temperature above the melting point of the particular polymer to be used for impregnating the roving. By this means the melt viscosity of the polymer in the local region of the spreader surface may be maintained at a considerably lower value than the polymer in the bulk of the impregnation bath. This process has the advantage that a very small proportion of the polymer can be raised to a relatively high temperature so that a low impregnation viscosity can be obtained with minimum risk of degradation to the major proportion of the polymer in the bath. This in turn greatly reduces the problem arising from the fact that some polymer may remain in the bath for an almost unlimited period during a given processing period because the polymer supply in the bath is continually replenished. Thus some of the polymer present at the start of a processing period may still be present in the bath at the end of the processing period. Despite this long dwell time in the bath such polymer will have been subjected to a less severe thermal history than if the whole of the polymer in the bath had been subjected to a high temperature to obtain a low viscosity throughout the bath.

A further advantage of the local heating process is that polymers of poorer thermal stability may be used. Furthermore, polymers of higher molecular weight may be used because the lower degradation arising from the lower overall thermal history enables a higher temperature to be used locally to produce lower viscosity melt.

The supply of polymer to the impregnation bath may be in the form of polymer powder which is melted in the bath by external heating elements or by the internally disposed heated spreader surfaces or alternatively the bath may be fed with molten polymer using, for example, a conventional screw extruder. If the bath is provided with heated spreader surfaces the polymer melt delivered from the extruder should be at as low a temperature as possible to minimise thermal degradation. The use of a melt feed has the advantages of easier start-up, better temperature control and the avoidance of unmelted polymer lumps which result in various processing problems particularly when very thin structures are produced.

The impregnated fibre product may be pulled through a means for consolidating the product such as a sizing die. The temperature of the die has been found to have a significant effect on the process. Although it would be predicted that a hot die should be used to minimise friction in the die and to aid consolidation it has been found that a die which is held at a temperature at or above the melting point of the polymer used gives rise to an erratic stick-slip behaviour as the product is pulled through the die. It has been found that it is preferable to use a cooled die and to ensure that the surface temperature of the pultruded section entering the die is at a temperature of not more than 20° C. above the softening temperature of the polymer. By "softening temperature" we mean the lowest temperature at which the polymer can be sintered. This can be achieved by blowing air on the lace during its path between the impregnation bath and the die and/or spacing the die from the impregnation bath. If the pultruded section is too hot polymer is squeezed out as the product enters the die. This leaves a deposit at the entrance to the die which builds up and can score the pultruded section as it passes through the die. The pultruded section should not be cooled to a temperature below the softening point of the polymer because it will be too difficult to shape the product in the sizing die.

The dimensions of the fibre-reinforced product can be varied as desired. Thin sheet can be produced by separating the fibres of a number of rovings by passing them over a spreader surface so that the fibres form a band in contiguous relationship. Where a die has been used to consolidate the fibres the structure will take on the cross section of the sizing die. This can give articles of any required thickness, for example from 0.25 mm to 50 mm thick or linear profiles. Where the means of consolidation comprises the nip formed from at least one pair of rotating rollers, sheets having a thickness of 0.05 mm or even less can be produced In a further process for producing fibre-reinforced structures according to the invention it has been found possible to achieve satisfactory wetting even though the thermplastics polymer used has a melt viscosity significantly in excess of 30 Ns/m$^2$.

Accordingly there is provided a process of producing a fibre-reinforced composition comprising tensioning and aligning a plurality of continuous filaments to provide a band of contiguous filaments, passing the band over a heated spreader surface so as to form a nip between the band and the spreader surface, maintaining a feed of a thermoplastics polymer at the nip, the temperature of the spreader surface being sufficiently high to give a polymer melt of viscosity capable of wetting the continuous filaments as they are drawn over the spreader surface. Whilst it is preferred that the polymer melt in the cusp of the nip has a viscosity of less than 30 Ns/m$^2$, a high back tension on the filaments fed to the spreader surface will ensure that polymer impregnation in the nip area is favoured, so that it is possible to produce a well impregnated band at a significantly higher viscosity than 30 Ns/m$^2$. Thus this process provides a means of maximising the molecular weight of the polymer that may be used in a thermoplastics polymer pultrusion process.

In one embodiment of this process the continuous filaments are most suitably tensioned and aligned by pulling them from rolls or reels over a series of spreader surfaces, such as the surfaces of rods. This enables bundles of filaments to be spread out as far as possible into individual filaments which are under considerable tension. These filaments are guided to provide a band of contiguous filaments as they pass over a heated spreader surface. The shape of the spreader surface and the angle of contact of the filament band with the surface should be such as to provide a nip between the band and the heated spreader surface. A thermoplastics polymer powder is fed to the nip and the heated spreader surface is maintained at a temperature sufficient to melt the thermoplastics polymer. The melt impregnates and wets the fibres of the band as the band passes over the heated spreader surface.

This process may be further modified by providing at least one further heated spreader surface with which the at least partially polymer impregnated fibre band forms a second nip by means of which a further supply of polymer melt may be impregnated into the fibre band. Either surface of the partially impregnated band can be used to form the working surface of the nip.

The amount of polymer in the reinforced structure is controlled to a large extent by the tension in the band and the length of path over which the band contacts the heated spreader surface. Thus where the band is under high tension and contacts the spreader surface over a substantial area, so that the band is strongly urged against the spreader surface, the polymer content of the reinforced structure will be lower than under low tension/short contact path conditions.

The heated spreader surfaces and any subsequent heated or cooled surfaces used to improve impregnation or to improve surface finish are preferably in the form of cylindrical bars or rollers. These may be stationary or capable of either free or driven rotation. For example, the first impregnation surface may be a freely rotating roller which will be caused to rotate by the band at the speed of the band so that attrition of the fibre prior to impregnation or sizing by the melt is reduced to a minimum. It has been observed that if the first roll is rotated (either freely or driven) in the direction of the movement of the fibre at up to the speed of the fibre any accumulation of loose fibre on the band is carried through the system. This self-cleaning action is particularly useful in preventing an accumulation of fibre at the first roll which could cause splitting of the band. After the band has picked up some molten polymer, preferably after being provided with further molten polymer on the other side of the band by means of a second freely rotatable heated surface, the fibre is much less susceptible to attrition and may be subjected to treatments to improve wetting of the fibres. Thus the polymer-containing band may be passed over at least one roller driven in a direction opposite to that of the travel of the band to increase the local work input on the band and maximise wetting. In general, the degree of wetting and the speed of the process may be increased by increasing the number of surfaces at which there is a work input.

A further advantage of the process employing a band of fibre to form a nip, over the process which requires the use of a bath of molten polymer, is that of reducing the risk of degradation. Thus the relatively small amount of polymer present in the nip between the fibre band and the spreader surface ensures that large quantities of polymer are not held at an elevated temperature for prolonged periods. Provision can also be made to include a scraper blade at positions at which polymer is fed to the nip to remove any excess polymer which might accumulate during processing and which might be subject to thermal degradation.

When the product of the process of the invention is required as a thin reinforced sheet the product produced by impregnation at a nip may be further treated by passing over or between further rolls either heated or cooled to improve impregnation or to improve the surface finish of the sheet. The thin sheet has a tendency to curl if one side of the sheet contains more polymer than the other side. This situation can be avoided by positioning an adjustable heated scraper in proximity to the last roll in the series to remove excess polymer on the sheet surface. The scraper bar should be at a temperature just in excess of the melting point of the polymer. For example in the case of polyetheretherketone which reaches a temperature of about 380° C. in the impregnation zones the scraper bar temperature should be about 350° C.

The impregnated band may then be subjected to further treatments depending on the intended shape and purpose of the end product. The separated filaments in the impregnated band may, for example, be drawn together through a die to provide a profile of considerably greater thickness than the impregnated band. A limited amount of shaping may be effected in such a die to provide a shaped profile.

The impregnated products of the processes hereinbefore described may be wound on rolls for subsequent use in fabrication processes requiring a continuous product or may be chopped into lengths for subsequent fabrication. The continuous lengths may be used to fabricate articles, for example, by winding the heat-softened product around a former, or, for example, by weaving a mat from tapes or strips of the product. The impregnated product may be chopped into pellets or granules in which the aligned fibres have lengths from 3 mm up to 100 mm. These may be used in conventional moulding or extrusion processes.

When glass fibre is used the fibre content of the product of the invention should be at least 50% by weight of the product to maximise the physical properties of the product. The upper limit of fibre content is determined by the amount of polymer required to wet out the individual fibres of the roving. In general it is difficult to achieve good wetting with less than 20% by weight of polymer although excellent results are obtainable using the process of the invention to incorporate 30% by weight of polymer in the fibre-reinforced composition.

The product of the invention formed by the process of impregnating a band of contiguous rovings at a nip formed by the band and a heated spreader surface will normally be hauled off the impregnation system as a band or sheet of material. This provides a useful intermediate for many applications. Thin bands or sheets, that is those having a thickness of less than 0.5 mm and greater than 0.05 mm are particularly useful and versatile.

Tapes are particularly useful for forming articles woven using a tabby or satin weave (these terms are used in the weaving art and are described in the Encyclopedia Brittanica article on "Weaving"). A satin weave gives a particularly good product as shown in the examples of this specification. Woven articles of exceptionally high performance are obtained using the tapes produced according to this invention and having a breadth of tape at least 10 times the thickness of the tape. An important application is as a thin reinforced sheet which is to be used to form a reinforced article from a number of plies of the reinforced sheet, with the reinforcement of each layer disposed in any chosen direction in the plane of the layers, by compressing the layers at a temperature sufficient to cause the polymer of the layers to coalesce. The layers may be used as flat sheets which may be shaped in a mould during or after the coalescing stage, or they may be wound or formed on a shaped mandrel which after a coalescing stage gives an article having the shape of the mandrel.

It is already known, for example as disclosed in British Patent Specification No. 1 485 586 to produce reinforced shaped articles by winding reinforcing filaments on a shaped mandrel and interposing layers of polymer film between layers of filaments with subsequent coalescence of the polymer films. The present invention has advantages over such a process. The major benefits are the avoidance of the use of high cost preformed polymer films, the avoidance of the need to provide films of various thicknesses because the polymer content can be controlled by the tension in the band and the benefits derived from the continuous nature of the process of the invention.

The pultruded products of the invention are also suitable, when chopped to appropriate dimensions for providing selective reinforcement in shaped articles moulded from polymeric materials in a process in which at least once preformed element consisting of a product according to the present invention is located in a mould to provide reinforcement in a selected portion of the finished moulding and polymeric material is moulded around the in situ reinforcement to provide a shaped article.

The invention not only permits the fibrous reinforcement to be located in the shaped article with maximum effect with respect to the stresses the shaped article will be subjected to in use but overcomes the processing problems involved in producing such high strength articles by alternative processes. In particular the process can be used to produce such reinforced articles using the high productivity injection moulding process using conventional thermoplastic polymers with melt viscosities of 100 Ns/m$^2$ or more.

It may be advantageous in some applications to use the preformed element at a temperature at which it is readily pliable so that it can be more readily located in the mould, for example by winding the heat softened preformed element on a mould insert.

The moulding process used may be any process in which a shaped article is formed from a polymeric material in a mould. The polymeric material may be a thermoplastics material which is introduced into the mould as a melt, such as in injection moulding or as a powder, as in compression moulding. Included in the term "compression moulding" is the process of compressing a polymer powder without melting and subsequently sintering the "green" moulding outside the mould. The thermoplastics polymeric material moulded in the mould may also be derived by introducing into the mould a monomer or monomers, or a partially polymerised medium which is held in the mould until fully polymerised, for example, under the influence of heat or chemical activators or initiators.

It is preferred that the polymer which is moulded around the performed insert is the same as or is at least compatible with the polymer used to impregnate the preformed insert.

The impregnated products obtained from the processes hereinbefore described find particular utility when chopped into pellets or granules in which the reinforcing fibres have a length of at least 3 mm and preferably at least 10 mm. These products may be used in the conventional fabrication process such as injection moulding and show advantages over prior art products in pellet form because the fibre length in the pellet is retained to a much greater extent in articles fabricated from the pellets of the invention than when using the prior art products. This greater retention of fibre length is believed to be a result of the greater protection afforded to the individual reinforcing filaments in the product of the invention by virtue of the good wetting by polymer which arises from use of the processes hereinbefore described.

This aspect of the invention is particularly important because it enables reinforced articles to be formed in versatile operations, such as injection moulding, which employ screw extrusion processes to melt and homogenise the feed material, with a surprisingly high retention of fibre length and consequent enhancement of physical properties. Thus the product of the invention enables moulded articles to be obtained from fabrication processes which employ screw extrusion which articles contain at least 50% and preferably at least 70% by weight of the fibres in the article of a length at least 3 mm long. This is considerably longer than currently obtainable from the commercially available reinforced products. An alternative process of forming moulded articles by melting and homogenising short lengths, that is lengths between 2 and 100 mm, of the reinforced products of the invention is by calendering. For example, a sheet product can be made in this manner.

The products suitable for injection moulding may be used directly or may be blended with pellets of other thermoplastics products. These other products may be of the same polymer but having higher molecular weight or may be of a different polymer providing that the presence of the different polymer does not adversely affect the overall balance of properties of the composition. The other products may be an unfilled polymer or may contain a particulate or fibrous filler. Blends with materials containing the conventionally produced reinforced moulding powders, that is moulding powders with reinforcing fibres up to about 0.25 mm long are particularly suitable because the overall reinforcing fibre content of the blend can be kept high to produce maximum strength even though the shorter reinforcing fibres do not contribute so effectively as the long fibres present from the product of the present invention.

The chopped form of the continuous pultrusion is also very useful as a feedstock for the method described in copending British Patent Application No. 8101822 in which a fibre-reinforced shaped article is produced by extruding a composition comprising a settable fluid as a carrier for fibres at least 5 mm in length through a die so that relaxation of the fibres causes the extrudate to expand to form an open fibrous structure containing randomly dispersed fibre as the extrudate leaves the die and compressing the porous structure produced whilst the carrier is in a fluid condition into a shaped article.

By "settable" is meant that the fluid may be "set" into such a form that it holds the fibre in the random orientation, which occurs on extrusion. Thus, for example, the settable fluid may be a molten thermoplastics material which is extruded in its molten state and then set by cooling until it freezes.

Preferably the expanded extrudate is extruded directly into a mould chamber provided with means for compressing the porous extrudate into a shaped article and the extrudate is compressed into a shaped article before the extrudate is caused or allowed to set.

The extrudate formed in the process contains randomly dispersed fibres so that the only orientation of fibres in the shaped article is that which might arise as a result of the compression process.

The process can be used at high fibre loadings, that is in excess of 30% by volume of fibre. Little fibre breakage occurs in the process so that showed articles of exceptionally high strength measured in all directions in the article can be obtained.

Pellets obtained by chopping the pultruded product of the present invention into lengths of at least 5 mm and preferably at least 10 mm are preferred. The upper limit is determined by the extent of the problems encountered in feeding material to the extruder which will melt the product. Lengths at least up to 50 mm can be employed although with long lengths the amount of fibre breakage increases so that the benefit of long fibre length is partially eroded.

Although it is necessary to use the relatively low molecular weight polymers, for example polymers having a melt viscosity below 30 $Ns/m^2$ and preferably below 10 $Ns/m^2$ to achieve adequate wetting of the roving and although it is surprising that such a product has such high levels of physical properties the invention does not exclude the subsequent processing step of increasing the molecular weight of the polymer in the composition by known techniques. Such techniques include solid phase polymerisation in the case of condensation polymers, the use of cross-linking agents or irradiation techniques. In the case of increasing the molecular weight using cross-linking agents it is necessary to intimately mix these in the composition. This may only be practicable if they are already present during the impregnation process but in such cases care must be taken to ensure that they are not activated before the wetting process is complete.

The invention is further illustrated with reference to the following examples.

EXAMPLE 1

Copolymers of polyethylene terephthalate in which 20% by weight of the terephthalic acid had been replaced by isophthalic acid and having the intrinsic viscosity values listed in Table 1 were used to prepare polymer melts in a bath at a temperature of approximately 290° C. A glass roving containing 16000 individual filaments was pulled through the molten polymer over one spreader bar situated in the bath at a rate of 30 cm/minute giving a dwell time in the bath of 30 seconds. The impregnated roving was pulled through a 3 mm diameter die in the wall of the bath and then cooled.

The viscosity of the melt and the intrinsic viscosity of the polymer feedstock and the polymer in the reinforced composition were measured. The extent of the wetting of the fibres and the void content were assessed by comparing the weight of a completely wetted length of impregnated product with the same length of product with an unknown extent of wetting. The completely wetted control material is obtained by operating the pultrusion process at a very slow rate with a low viscosity melt so that a completely transparent product is obtained. Thus the completely wetted standard is taken to be a sample which is transparent and which has been prepared under conditions which optimise the parameters favourable to wetting. The extent of wetting values given in the table are derived from the relationship:

$$\text{Degree of wetting} = \frac{M_2 - M_1}{M_0 - M_1} \times 100\%$$

where the mass per unit length of the transparent sample is $M_0$, the mass per unit length of the glass is $M_1$ and the mass per unit length of the sample to be assessed is $M_2$. The void content is given by subtracting the percentage degree of wetting from 100%.

The strength of the product was assessed by measuring the force required to break a specimen of the 3 mm rod in flexure placed across a 64 mm span.

The results obtained are given in Table 1.

TABLE 1

| Intrinsic viscosity (dl/g) | | Melt viscosity during pultrusion (Ns/m²) | Extent of fiber wetting (%) | Force at break (N) |
| --- | --- | --- | --- | --- |
| Feedstock | After pultrusion | | | |
| 0.18 | 0.15 | 0.2 | 100 | 129 |
| 0.4 | 0.35 | 1.8 | 100 | 158 |
| 0.43 | 0.38 | 3.0 | 100 | 151 |
| 0.45 | 0.4 | 6 | 96 | 143 |
| 0.49 | 0.44 | 15 | 86 | 154 |
| 0.60 | 0.5 | 30 | 70 | 122 |

EXAMPLE 2

The polymer used in Example 1 having an intrinsic viscosity of 0.45 dl/g was evaluated over a range of melt temperatures and haul through rates. The results obtained are recorded below in Table 2.

TABLE 2

| Melt temperature (°C.) | Melt viscosity (Ns/m²) | Extent of fiber wetting (%) | | | Force at break (N) | | |
| --- | --- | --- | --- | --- | --- | --- | --- |
| | | Haul through rate of (cm/min) | | | | | |
| | | 21 | 36 | 60 | 21 | 36 | 60 |
| 255 | 18 | 98 | 84 | 62 | 102 | 70 | 40 |
| 275 | 10 | 100 | 100 | 90 | 121 | 114 | 70 |
| 290 | 6 | 100 | 100 | 92 | 139 | 127 | 94 |
| 310* | 3 | 98 | 98 | 92 | 155 | 140 | 94 |

*Excessive degradation occurred at this temperature.

EXAMPLE 3

A PET homopolymer having a melt viscosity at 280° C. of 6 Ns/m² was pultruded as described in Example 1 using a glass fibre made up of filaments of diameter 17 μm at 280° C. using a single spreader bar and a line speed of 30 cm/minute to give a pultruded rod approximately 3 mm diameter. The glass content of the product was varied by altering the number of strands in the rovings fed to the bath. The flexural modulus and force at break were determined as a function of glass content using a 64 mm span.

TABLE 3

| Weight % glass | | Flexural Modulus (GN/m²) | Force at break (N) |
| --- | --- | --- | --- |
| By calculation | By ash content | | |
| 62 | 63 | 42(3) | 217(19) |
| 56 | | 37(2) | 201(36) |
| 52 | | 38(3) | 204(16) |
| 47 | | 27(5) | 191(24) |
| 43 | | 17(4) | 112(25) |
| 37 | 36 | 12(1) | 92(25) |

(Five determinations in each case, figure in parenthesis indicates standard deviation.)

These results indicate an approximate plateau in modulus and strength in the region 50 to 65% glass (by weight).

EXAMPLE 4

Conventional grades of polypropylene have viscosities at low shear rates in excess of 100 Ns/m² and are not conveniently processed by pultrusion. For example the melt viscosity of 'Propathene' HF11, a polypropylene homopolymer, is about 3000 Ns/m² at low shear at 280° C. or about 10000 Ns/m² at 230° C. In order to make a polymer suitable for pultrusion 'Propathene' HF11 was blended with 0.1% calcium stearate, 0.1% 'Irganox' 1010 and 0.5% 'Luperco' 101XL ('Luperco', 101XL is an organic peroxide dispersed with calcium carbonate) so that degradation would occur. This composition was pultruded at 30 cm/minute using a single spreader at temperatures of 230° C. and 290° C. At 230° C. (melt viscosity 30 Ns/m²) the wetting was poor. At 290° C. (melt viscosity 17 Ns/m²) the wetting was moderate.

EXAMPLE 5

A sample of 'Victrex' polyethersulphone having an RV of 0.3 was pultruded with the glass fibre used in Example 3 at 405° C. at 21 cm/minute using a single spreader bar (having a melt viscosity of 30 Ns/m²) giving a moderately wetted extrudate. At lower temperature, where the viscosity was higher, the sample was poorly wetted.

EXAMPLE 6

The wetting of the rovings is clearly influenced by the number of spreader bars, and for the same operating conditions an increase in line speed can be effected by increasing the number of spreaders for any degree of wetting.

The glass fibre used in Example 3 was pultruded at 280° C. with PET homopolymer using a single spreader and a speed of 20 cm/minute to give a totally wetted product (transparent) The dwell time in the bath under these conditions was about 30 seconds. The use of three spreaders allowed an increase in line speed to 120 cm/minute for a transparent well-wetted pultrusion. The dwell time under these conditions was about 10 seconds.

EXAMPLE 7

A number of polymers were used according to the general procedure of Example 1 to produce pultruded sections from a glass roving containing 16000 filaments. The roving was pulled through molten polymer over one spreader bar at a rate of 15 cm/minute to give a product containing about 65% by weight of glass in each case. The polymers used, the melt temperatures employed, the melt viscosities at those temperatures and the properties obtained are detailed in Table 4.

TABLE 4

| Polymer Type | Processing Conditions | | Physical Properties | | |
|---|---|---|---|---|---|
| | Melt Temperature (°C.) | Melt Viscosity (Ns/m$^2$) | Flexural Modulus (GN/m$^2$) | Flexural Strength (MN/m$^2$) | Interlaminar Shear Strength (MN/m$^2$) |
| Poly(ethylene terephthalate) | 290 | 6 | 31 | 550 | 42 |
| Nylon 66 | 320* | 30 | 28 | 600 | — |
| Poly(methyl methacrylate) | 250 | 8 | 30 | 550 | — |
| Polypropylene | 260 | 5 | 30 | 350 | 10 |
| Polyetheretherketone | 400 | 20 | 30 | 650 | 45 |
| Polyethersulphone | 350 | 8 | 30 | 500 | — |
| Polyphenylene sulphide | 320 | 5 | 40 | 750 | 23 |

* = Some degradation occurring.

In the case of the polyethylene terephthalate the pull through speed was increased above 15 cm/mm to examine the effect of void content on physical properties. Table 5 below records properties measured on the 3 mm diameter rod produced. These indicate that a void content of less than about 5% gives superior properties.

TABLE 5

| Void content (%) | Flexural Modulus (GN/m$^2$) | Flexural Strength (MN/m$^2$) | Interlaminar Shear Strength (MN/m$^2$) | Flexural Modulus as percentage of calculated value |
|---|---|---|---|---|
| 0.2 | 31 | 550 | 42 | 91 |
| 5 | 31 | 570 | 42 | 91 |
| 6 | 28 | 550 | 41 | 90 |
| 10 | 24 | 480 | 32 | 82 |
| 13 | 23 | 440 | 36 | 74 |
| 15 | 20 | 330 | 29 | 71 |

EXAMPLE 8

A sample of carbon fibre-reinforced polyetherketone was prepared by pulling a carbon fibre tape containing 6000 individual filaments through a bath of molten polyetherketone at a temperature of 400° C. at a speed of 25 cm/minute. A product having a flexural modulus of 80 GN/M$^2$, a breaking stress of 1200 MN/m$^2$ and an interlaminar shear stress of 70 MN/m$^2$ was obtained.

EXAMPLE 9

This example illustrates how the mechanical properties of pultrusions vary with the volume fraction of fibre and with the resin type. The samples are compared at fixed volume concentration. The low flexural strength of the composites based on polypropylene is a reflection of the tendency for less stiff resins to fail in a compressive mode. Polypropylene resin has a modulus of about 1 GN/m$^2$ while polyethylene terephthalate has a modulus of about 2 GN/m$^2$. The pultrusions were produced according to the general procedure of Example 1 with resins of the preferred viscosity level, about 3 Ns/m$^2$.

TABLE 6

| Resin | Volume fraction glass % | Flexural Modulus (GN/m$^2$) | Flexural strength (MN/m$^2$) | Interlaminar shear strength (MN/m$^2$) |
|---|---|---|---|---|
| PET | 40 | 21 | 630 | |
| | 50 | 31 | 690 | 26 |
| | 60 | 38 | 800 | |
| Polypropylene | 40 | 26 | 340 | |
| | 50 | 33 | 340 | 10 |
| | 60 | 38 | 310 | |

This Example indicates a clear preference for a resin of high modulus for applications where high compressive strength is required.

EXAMPLE 10

A sample of 64% by weight glass in PET was pultruded to form a tape 6 mm wide by 1.4 mm thick. This tape was remelted and wound under tension onto a former 45 mm in diameter and consolidated on the former and then allowed to cool. After cooling the former was withdrawn leaving a filament wound tube. Tubes of varying thickness up to 4 mm were wound in this way.

EXAMPLE 11

Samples of 3 mm diameter uniaxially oriented pultrusion based on PET containing 64% by weight glass were remelted and twisted so that the fibres were given a helical form. These twisted rods were tested in flexure and the stiffness breaking force and total work to failure were measured. The total work of failure was determined as the area under the force deformation curve up to failure and for convenience is presented here as a function of the area under the untwisted control sample.

TABLE 7

| Angle of twist | Flexural Modulus (GN/m²) | Breaking Force (N) | Comparative total work to failure |
| --- | --- | --- | --- |
| 0° control | 36 | 135 | 1 |
| 11° | 33 | 118 | 1.3 |
| 23° | 24 | 85 | 1.6 |

It is noted that at 11° there is only a 10% reduction in stiffness and breaking force whereas total work to failure is increased by 30% giving an improved balance of properties. At 23° the stiffness and strengths are both reduced by about 60% and the work of failure is only increased by 60%. This indicates an optimum twist of the order of 11°.

Thermoplastic pultrusions are more suitable than thermoset pultrusions for taking advantage of this energy absorbing mechanism because of the ease with which they can be post formed.

EXAMPLE 12

Pultrusions 3 mm in diameter and containing 50% by volume glass fibre in PET were melted at 280° C. and than braided together. The braided product was less stiff then uniaxially aligned material but absorbed more energy in testing for impact failure.

EXAMPLE 13

Flat tape approximately 1.4 mm thick and 6 mm wide formed of 50% by volume (64% by weight) glass fibre in PET were woven together in an open tabby weave. Four layers of that weave were stacked together and compression moulded at 280° C. into a sheet 3 mm thick. The sheet had the following properties:

| | |
| --- | --- |
| Flexural modulus (maximum)* | 15 GN/m² |
| Impact energy - initiation | 7 J |
| - failure | 25 J |

EXAMPLE 14

Examples of various pultrusions were placed in the moulds of conventional injection mouldings and compatible polymer was moulded round them. The mouldings had enhanced stiffness and strength.

Thermoplastic pultrusions are especially suitable for reinforcing mouldings in this manner because they can be made with a polymer which is entirely compatible with the polymer to be moulded around the reinforcement.

EXAMPLE 15

A rod of 65% by weight glass fibre in PET was chopped to 1 cm lengths and diluted on a 50/50 basis with normally compounded material containing 30% by weight of short glass fibre in PET. This mixture was injection moulded using normal technology to give ASTM bars having the following properties in comparison with normally compounded material containing 50% by weight of glass fibre in PET.

TABLE 8

| | Blend containing pultruded material | Normally compounded |
| --- | --- | --- |
| Flexural Modulus | 16.1 | 14.4 |
| Impact Energy notched Izod test | 270 J/m | 120 J/m |
| Glass content (wt %) | 47% | 45% |

Inspection of ashed sections of the moulding revealed that most of the long fibres had been retained through the moulding operations. This unexpected property is believed to result from the low void content or high degree of fibre wetted by polymer in the chopped pultruded material.

EXAMPLE 16

Various Examples of pultruded materials including PET with 60% by weight of glass fibre and PEEK containing 60% by weight of carbon fibre were chopped to 1 cm length and moulded using the method described in British Patent Application No. 8101822 in which an expanded reinforced material is produced by extrusion through a die of short length, preferably of zero length, and is subsequently compression moulded to give three dimensional shaped articles containing 60% by weight of long fibre.

Pultruded material is especially suitable for this application because the high level of wetting obtained effectively protects the fibres and reduces the attrition between them which causes fibre breakdown.

EXAMPLE 17

The procedure of Example 1 was followed to produce a tape formed in a cooled sizing die approximately 1.4 mm thick by 6 mm wide at line speeds of about 0.2 m/minute using PET having a melt viscosity at 280° C. of 3 Ns/m².

Not all commercial glass fibres are ideal for pultrusion with thermoplastics. The most important difference is the size system used. Several commercially available grades were compared together with a study of the effect of crystallinity. As produced the pultrusions were amorphous but they were readily crystallised by heating to 150° C. In the following table all samples of different glass are compared at the same weight fraction of 64% by weight of glass fibre.

TABLE 9

| | Properties in flexure at 23° C. | | | | | |
| --- | --- | --- | --- | --- | --- | --- |
| | Amorphous resin | | | Crystalline resin | | |
| Glass Fiber | Modulus (GM/m²) | Strength (MN/m²) | ILSS (MN/m²) | Modulus (GM/m²) | Strength (MN/m²) | ILSS (MN/m²) |
| A | 25 | 520 | 33 | 32 | 510 | 24 |
| B | 31 | 690 | 26 | | | |
| C | 21 | 300 | 17 | 29 | 310 | 14 |
| D | 30 | 771 | 41 | 35 | 733 | 17 |
| E | 28 | 420 | 40 | 34 | 523 | 36 |

TABLE 9-continued

| | Properties in flexure at 23° C. | | | | | |
|---|---|---|---|---|---|---|
| | Amorphous resin | | | Crystalline resin | | |
| Glass Fiber | Modulus (GM/m²) | Strength (MN/m²) | ILSS (MN/m²) | Modulus (GM/m²) | Strength (MN/m²) | ILSS (MN/m²) |
| F | 27 | 533 | 38 | 30 | 520 | 30 |

The crystalline form, offering higher stiffness, is to be preferred for many applications but it is important that a high value of interlaminar shear stress (ILSS), preferably greater than 20 MN/m², is retained.

EXAMPLE 18

High performance composites frequently need to be capable of performing a service at high temperature. Using 64% by weight of the glass E used in Example 17 in PET, the following properties were determined at elevated temperature for crystalline pultrusions.

TABLE 10

| | Flexural Properties | | |
|---|---|---|---|
| Temperature (°C.) | Modulus (GN/m²) | Strength (MN/m²) | ILSS (MN/m²) |
| 23 | 34 | 523 | 36 |
| 50 | 27 | 433 | 30 |
| 70 | 27 | 411 | 32 |
| 100 | 26 | 348 | 27 |
| 150 | 24 | 189 | 24 |
| 200 | 23 | 180 | 19 |

EXAMPLE 19

Hot water is a common aggressive environment in which composites are required to retain their properties. Samples based on 64% by weight of the glass fibre E used in Example 17 pultruded with PET and immersed in a water bath at 95° C. for varying times. Samples were tested both amorphous and crystalline. Properties deteriorated with time, interlaminar shear strength (ILSS) being the most sensitive property.

TABLE 11

| Immersion time | ILSS (MN/m²) | |
|---|---|---|
| (hours) | Amorphous | Crystalline |
| 0 | 40 | 34 |
| 0.75 | 39 | 30 |
| 4 | 35 | 31 |
| 24 | 24 | 28 |
| 48 | 32 | |
| 70 | 25 | 22 |
| 94 | 19 | 22 |
| 112 | 22 | |

In some other glass systems the interlaminar shear strength deteriorated to less than 10 MN/m² after 4 hours exposure.

EXAMPLE 20

Resistance to fatigue is an important factor in the service properties of composite materials. Samples of well wetted pultrusion were prepared based on 64% by weight of the glass fibre E used in Example 17 in PET. A sample was tested in flexure to study the stress/strain relationship at 23°.

TABLE 12

| Stress (MN/m²) | Strain (%) | Stress/strain (GN/m²) |
|---|---|---|
| 150 | 0.48 | 31 |

TABLE 12-continued

| Stress (MN/m²) | Strain (%) | Stress/strain (GN/m²) |
|---|---|---|
| 228 | 0.74 | 31 |
| 300 | 0.96 | 31 |
| 377 | 1.24 | 30 |
| 464 | 1.60 | 29 |
| 532 | 1.96 | 27 |
| 584 | 2.30 broken | 25 |

The sample has a linear elastic limit at 1% strain.

Samples were flexed in three point bending using a span of 70 mm at a rate of one cycle every two seconds. The number of cycles was noted for significant damage (judged by a whitening of the pultrusion) to be induced.

TABLE 13

| Strain in fatigue test (%) | No. of cycles to damage |
|---|---|
| 0.86 | >1,100,000 |
| 1.03 | 50,000 |
| 1.20 | 22 |
| 1.37 | 14 |
| 1.54 | 8 |
| 1.70 | 1 |

Samples were strained at 0.1% strain and their properties were evaluated after different histories.

TABLE 14

| | Flexural Properties | | |
|---|---|---|---|
| No. of cycles | Modulus (GN/m²) | Strength (MN/m²) | ILSS (MN/m²) |
| 0 | 30 | 530 | 38 |
| 174,000 | 29 | 470 | 38 |
| 600,000 | 28 | 460 | 33 |
| 773,000 | 30 | 500 | 36 |
| standard deviation | 3 | 40 | 3 |

The tests included evaluating the sample with the surface which had been under tension during the fatigue history in both compression and tension. No differences were observed in these two modes.

The properties of the pultrusion were not affected by this fatigue history.

EXAMPLE 21

Samples of tape approximately 1.4 mm thick by 6 mm wide were prepared based on the glass fibres used in Example 17 in PET. The glass content was varied and in all cases the pultrusions were translucent.

TABLE 15

| | Flexural Properties | | |
|---|---|---|---|
| Wt % glass | Modulus (GN/m²) | Strength (MN/m²) | ILSS (MN/m²) |
| 46 | 17 | 250 | 33 |
| 64 | 30 | 770 | 41 |
| 73 | 35 | 950 | 40 |

TABLE 15-continued

| Wt % glass | Flexural Properties | | |
|---|---|---|---|
| | Modulus (GN/m$^2$) | Strength (MN/m$^2$) | ILSS (MN/m$^2$) |
| 78 | 40 | 1040 | 44 |

EXAMPLE 22

High line speeds are highly desirable for economic production. Pultrusions were formed containing 69% by weight of the glass fibre D used in Example 17 in PET by drawing the pultrusion through a melt bath containing five spreading bars. Well wetted pultrusions were obtained at the following speeds and their properties were measured in flexure.

TABLE 16

| Line speed (m/minute) | Modulus (GN/m$^2$) | Strength (MN/m$^2$) | ILSS (MN/m$^2$) |
|---|---|---|---|
| 0.48 | 30 | 640 | 41 |
| 0.78 | 29 | 670 | 40 |
| 2.76 | 31 | 640 | — |

EXAMPLE 23

Pultrusions were made from the glass fibre E used in Example 17 in PET using a single spreader at 280° C. The viscosity of the resin was varied. With very low viscosity resin some resin was, squeezed from the pultrusion at the shaping stage where it was compressed into a tape 6 mm wide by 1.4 mm thick. The line speed was set at 0.2 m/minute. The pultrusions were tested in flexure in both the amorphous and the crystalline form. The crystalline form was obtained by heating the sample briefly to 150° C.

TABLE 17

| Resin melt viscosity at 280° C. (Ns/m$^2$) | Glass content (wt %) | Amorphous | | | Crystalline | | |
|---|---|---|---|---|---|---|---|
| | | Modulus (GN/m$^2$) | Strength (MN/m$^2$) | ILSS (MN/m$^2$) | Modulus (GN/m$^2$) | Strength (MN/m$^2$) | ILSS (MN/m$^2$) |
| 0.01 | 73 | 37 | 670 | 21 | 21 | 180 | — |
| 0.1 | 75 | 36 | 690 | — | 22 | 350 | — |
| 3 | 64 | 28 | 550 | 41 | 29 | 550 | 31 |
| 20* | 69 | 27 | 780 | — | — | — | — |
| 40 | not possible to impregnate | | | | | | |

*poorly wetted

Samples of very low viscosity gave useful properties in the amorphous state but when crystallised the properties deteriorated badly.

At high viscosity the glass was poorly wetted (so giving a low resin concentration).

EXAMPLE 24

Tapes of the glass fibre E used in Example 17 were pultruded (in PET of melt viscosity 3 Ns/m$^2$ at 280° C.) over a single spreader to give well wetted tapes 6 mm wide but of different thicknesses, obtained by incorporating different amounts of glass. Samples tested were amorphous.

TABLE 18

| Thickness | Glass content | Flexural Properties | | |
|---|---|---|---|---|
| | | Modulus (GN/m$^2$) | Strength (MN/m$^2$) | ILSS (MN/m$^2$) |
| 1.4 mm | 64 | 28 | 550 | 41 |
| 2.8 mm | 61 | 27 | 520 | 39 |

TABLE 18-continued

| Thickness | Glass content | Flexural Properties | | |
|---|---|---|---|---|
| | | Modulus (GN/m$^2$) | Strength (MN/m$^2$) | ILSS (MN/m$^2$) |
| 4.3 mm | 68 | 33 | 570 | 31 |

EXAMPLE 25

Glass fibres having different diameters were pultruded with PET. The samples tested amorphous had the following properties.

TABLE 19

| Fibre diameter | Glass content | Flexural properties | | |
|---|---|---|---|---|
| | | Modulus (GN/m$^2$) | Strength (MN/m$^2$) | ILSS (MN/m$^2$) |
| 12 μm | 71 | 31 | 655 | 30 |
| 17 μm | 71 | 33 | 609 | 32 |
| 17 μm | 65 | 31 | — | — |
| 24 μm | 62 | 26 | 472 | 24 |

EXAMPLE 26

Polyethersulphone having a melt viscosity of 8 Ns/M$^2$ at 350° C. was used to impregnate the glass fibre E used in Example 17 using a single spreader system at a line speed of 0.2 m/minute. The following properties were obtained.

TABLE 20

| Wt % glass | Flexural Properties | | |
|---|---|---|---|
| | Modulus (GN/m$^2$) | Strength (MN/m$^2$) | ILSS (MN/m$^2$) |
| 59 | 28 | 460 | 35 |
| 68 | 33 | 560 | 30 |

EXAMPLE 27

PEEK having a melt viscosity of 30 Ns/M$^2$ at 380° C. was used to impregnate carbon fibre in a single spreader pultrusion device at 0.2 m/minute. A rod 3 mm diameter was formed containing 60% by weight of carbon fibre.

EXAMPLE 28

Blends were made of conventional glass filled PET (short fibre compounded material prepared by extrusion compounding with PET of IV−0.75) and chopped 10 mm pultrusions (prepared according to Example 3). These blends were injection moulded to give discs 114 mm diameter and 3 mm thick filled from a rectangular side gate 1.5 mm thick by 10 mm wide. These samples were subjected to impact in an instrumented falling weight impact test and the failure energy noted.

TABLE 21

| Test | Wt % short fibres | Wt % long fibres | Total Wt % fibres | Failure energy J | Standard deviation |
| --- | --- | --- | --- | --- | --- |
| 1 | 30 | — | 30 | 4.8 | (0.6) |
| 2 | 45 | — | 45 | 5.3 | (0.6) |
| 3 | 22.5 | 15 | 37.5 | 7.3 | (0.6) |
| 4 | 15 | 30 | 45 | 8.7 | (0.4) |
| 5 | 7.5 | 45 | 52.5 | 8.8 | (0.4) |
| 6 | — | 60 | 60 | 8.7 | (1.0) |

All samples filled the mould with similar ease. This is because the polymer used to prepared the pultrusion samples was of lower molecular weight than that used to prepare the short fibre compound and this lower molecular polymer offset the increased resistance to flow due to the long fibre.

The results clearly indicate increased failure energy for the long fibre filled material despite the lower molecular weight of the polymer which would normally be expected to contribute to brittleness. Note especially the comparison between tests No. 2 and No. 4 and the same total weight percentage of fibres.

We further noted that whereas the short fibre mouldings splintered on impact allowing pieces of sharp plastic to fly off when more than half the weight fraction was of long fibres the mouldings failed in a safe manner all broken pieces remaining attached to the main part.

Ashing the mouldings after test revealed that much of the long fibre glass had retained most of its original length. Considerably more than 50% by weight of the original long fibres in the mouldings were more than 3 mm long.

The samples were also assessed for flexural modulus, anisotropy ratio, Izod impact strength and IV of the polymer in the mouldings. The values in the table below indicate reduced anisotropy and good notched impact relative to short fibre products.

TABLE 22

| Test | Bar flexural modulus (GN/m²) | Disc flexural modulus (GN/m²) | | Aniso-tropy ratio | Izod impact | | IV |
| --- | --- | --- | --- | --- | --- | --- | --- |
| | | 0° | 90° | | notched (Jm⁻¹) | un-notched (Jm⁻¹) | |
| 1 | 10.3 | 9.7 | 6.3 | 1.54 | 70 | 414 | 0.53 |
| 2 | 16.5 | 14.4 | 8.9 | 1.62 | 90 | 590 | 0.524 |
| 3 | 11.4 | 10.7 | 7.3 | 1.47 | 117 | 432 | 0.46 |
| 4 | 14.1 | 10.9 | 8.2 | 1.33 | 172 | 326 | 0.4 |
| 5 | 15.1 | 10.3 | 7.7 | 1.34 | 195 | 312 | 0.34 |
| 6 | 15.4 | 10.8 | 8.7 | 1.24 | 177 | 219 | 0.28 |

EXAMPLE 29

14 tapes of continuous carbon fibres (supplied by Courtaulds Ltd and designated XAS carbon fibres), each containing 6000 individual filaments were drawn at a rate of 25 cm/minute over a series of stationary guide bars to provide a band of width about 50 mm having a tension of about 100 lbs. When the fibres had been guided into contiguous relationship they were pulled over a single fixed heated cylindrical bar of 12.5 mm diameter. The temperature of the bar was maintained at about 380° C. A powder of polyetheretherketone having a melt viscosity of 20 $Ns/m^2$ at this temperature was fed to the nip formed between the carbon fibre band and the fixed roller. The powder melted rapidly to provide a melt pool in the nip which impregnated the fibre band passing over the roller. The structure was passed over and under five further heated bars without the addition of further polymer. A carbon fibre-reinforced sheet containing 58% by volume of carbon fibre and having a thickness of 0.125 mm was produced. The product was found to have the following properties:

| Flexural Modulus | 130 $GN/m^2$ |
| --- | --- |
| Flexural Strength | 1400 $MN/m^2$ |
| Interlaminar Shear Strength | 90 $MN/m^2$ |

EXAMPLE 30

The procedure of Example 29 was used with a polyethersulphone having a melt viscosity of 3 $Ns/m^2$ at 360° C. to produce a reinforced product containing 40% by volume of carbon fibre. The temperature of the roller was maintained at about 360° C. The product had a flexural modulus of 80 $GN/m^2$ and a flexural strength of 700 $MN/m^2$.

EXAMPLE 31

The procedure of Example 29 was used with the commercially available polyethersulphone PES 200P (available from Imperial Chemical Industries PLC) having a viscosity of 800 $Ns/m^2$ at 360° C. The roller temperature was maintained at about 360° C. and a product with 44% by volume of carbon fibre was produced. The product had the following properties:

| Flexural modulus | 60 $GN/m^2$ |
| --- | --- |
| Flexural strength | 500 $MN/m^2$ |
| Interlaminar shear stength | 25 $MN/m^2$ |

EXAMPLE 32

The general procedure of Example 29 was followed to produce an impregnated sheet using 14 tapes of continuous carbon fibres (Courtaulds' XAS, 6K tow) and polyetherether ketone having a melt viscosity of 30 $Ns/m^2$ at 370° C. In the apparatus five cylindrical bars each of diameter 12.5 mm were heated to 380° C. The 14 tapes were drawn under tension to give a band 50 mm wide passing into an adjustable nip formed by the first two bars with their longitudinal axes in a horizontal plane. The band subsequently passed under and over three further heated bars also having their longitudinal axes in the same horizontal plane. The use of the first two bars to form a nip enabled a polymer feed to be fed on both sides of the band. To avoid spillage of polymer two retaining metal sheets were placed in contact with the first two heated bars, disposed along the length of the bars, to provide a feed trough. Polymer powder was fed to either side of the band passing through the first two heated bars. The powder melted rapidly forming a melt pool in the two nips between either side of the band and each heated bar. The gap between the first two bars was adjusted so that when the haul-off was run at 0.5 m/minute the carbon fibre was coated with polymer and the resulting impregnated tape contained approximately 60% by weight of carbon fibre and 40% by weight of polymer. Adjustments to the fibre content were found to be achievable in several ways:
1 varying nip gap,
2 varying pretensioning,
3 varying the number of filaments fed to the nip,
4 varying the powder feed rate, 5 varying the temperature of the bars at the nip (with the resin used in this example the temperature range preferred was not greater than 400° C. because of degradation and not less than 360° C. because of the onset of crystallisation),
6 varying the haul-off rate.

The tape so formed appeared to be well wetted and was about 0.1 mm thick.

EXAMPLE 33

The tape described in Example 32 was cut to lengths of 150 mm and stacked in a matched die compression moulding tool. This tool was heated to 380° C., in a conventional laboratory press, and compressed so that the moulding was subjected to a pressure of between 2 and $5 \times 10^6$ N/m$^2$. The moulding was held at pressure for 10 minutes (approximately half of which time was required for the mould and sample to reach equilibrium temperature) and then cooled under pressure to 150° C. before removal from the press. The cooling stage took approximately 20 minutes. The mould was allowed to cool to ambient temperature and the moulding was then extracted.

Mouldings ranging in thickness from 0.5 mm (4 plies) to 4 mm (38 plies) were formed in this way. During the moulding operation a small amount of polymer was squeezed out of the mould as flash so that the mouldings contained 62% by weight of carbon fibre by comparison with 60% by weight in the original tape.

The mouldings were then cut using a diamond wafering saw to give specimens suitable for mechanical testing by flexural techniques. The following results were obtained:

| Property | Specimen span/depth ratio | Value |
|---|---|---|
| Flexural modulus | 70:1 | 130 GN/m$^2$ |
| Flexural modulus | 30:1 | 115 (6) GN/m$^2$ |
| Flexural strength | 30:1 | 1191 (55) MN/m$^2$ |
| Transverse flexural strength | 5:1 | 98 (11) MN/m$^2$ |
| Interlaminar shear strength | 5:1 | 81 (4) MN/m$^2$ |

(figures in parentheses indicate standard deviation)

EXAMPLE 34

Using the same equipment as Example 32 some poorly wetted tapes were produced by starving some sections of the tape while flood feeding others. The overall fibre content of the tape was the same as in Example 4 but many loose fibres were apparent on the surface of the tapes while other areas were rich in resin.

These tapes were stacked and moulded as described in Example 33 taking care that poorly wetted regions of one tape were placed adjacent to resin rich areas in the next tape. Visual inspection of the mouldings showed that substantial unwetted areas remained and loose fibres could easily be pulled from the surface. The mechanical properties of these mouldings was inferior to those noted in Example 33 and in particular the interlaminar shear strength was variable and low, values of 10 MN/m$^2$ (by comparison with 81 for the well wetted sample) being common.

This Example illustrates that fibre wetting takes place primarily at the impregnation stage and not during the secondary, moulding, stage. It is, however, believed that some wetting could be achieved by this secondary stage if higher pressures and longer dwell times were employed.

EXAMPLE 35

The tapes formed in Example 29 were split to give tapes approximately 15 mm wide and these tapes were woven using a tabby weave (as described by the Encyclopedia Britannica article on weaving) to give a sheet approximately 150 mm square.

EXAMPLE 36

A single woven sheet as described in Example 35 was compression moulded as described in Example 33 except that the moulding was simply carried out between aluminium sheets without side-wall constraint. The moulding was a flat sheet 0.2 mm thick.

In a further experiment five woven sheets as described in Example 7 were layed together such that each layer was oriented at ±45° to the layers above and below it. This stack was compression moulded without side-wall constraint to give a sheet 1 mm thick. A disc, 135 mm diameter, was cut from this sheet and the stiffness and strength of this disc were measured according to the techniques described by C J Hooley and S Turner (Mechanical Testing of Plastics, Institute of Mechanical Engineers, June/July 1979, Automotive Engineer) using the disc flexural test and the automated falling weight impact test.

The flexural stiffness of the plate had a maximum value of 50 GN/m$^2$ and a minimum value of 36 GN/m$^2$.

The impact resistance of the sheet was as follows:

| Initiation energy | 1.7 (0.3) J |
|---|---|
| Failure energy | 6.6 (1.1) J |

A parallel sided specimen cut along the line of maximum stiffness was measured in conventional flexural testing to give:

| Flexural modulus | 51 GN/m$^2$ |
|---|---|
| Flexural strength | 700 MN/m$^2$ |

EXAMPLE 37

A disc 135 mm diameter and 1 mm thick was prepared according to the procedure of Example 36 and subjected to nineteen impacts of 3J evenly dispersed over the surface of the disc. These impacts caused some delamination but the damaged moulding remained coherent.

The damaged disc was then remoulded and then tested as described in Example 36 with the following results:

| | Damaged and remoulded | Virgin (Ex. 5) |
|---|---|---|
| Flexural stiffness (max.) | 51 GN/m$^2$ | 50 GN/m$^2$ |
| Flexural stiffness (min.) | 37 GN/m$^2$ | 36 GN/m$^2$ |
| Impact initiation | 1.9 (0.1) J | 1.7 (0.3) J |
| Impact failure | 6.5 (2.8) J | 6.6 (1.1) J |

(standard deviation in parentheses)

There is no significant difference in the results.

This Example demonstrates total reclaim of properties after partial damage.

EXAMPLE 38

A damaged disc as prepared in Example 37 was broken through in impact five times using the instrumented falling weight test. The damage was localised to an area not much greater than the cross-section of the impactor and all broken parts remained attached to the main body of the moulding.

This broken moulding was then remoulded and impact tests were carried out on it taking care to direct the new impact at the spot which had previously been broken through giving the following results:

| | |
|---|---|
| Initiation energy | 1.8 (0.4) J |
| Failure energy | 4.6 (0.8) J |

(standard deviation in parentheses)

By comparison with the results of Examples 33 and 34 this shows that in the worst possible case approximately 70% of the original strength can be recorded.

EXAMPLE 39

A disc 135 mm in diameter and approximately 1 mm thick prepared according to Example 36 was heated to 380° C. and then placed in the female half of a cold hemispherical mould 200 mm diameter. The male half of the mould was pressed down by hand and a section of a hemisphere having a radius of curvature of 100 mm was formed. The section up to a diameter of ~100 mm (subtended by a solid angle of ~60° from the centre of the sphere of which it formed a part) conformed well to the double curvature but some crinkling occurred outside this area.

EXAMPLE 40

Woven sheets were prepared from 5 mm wide tape using a five shaft satin weave (as described in the Encyclopedia Britannica reference to weaving). In the dry state this weave gives excellent conformation to double-curved surfaces without allowing holes to appear in the weave. A five layer quasi-isotropic sheet was prepared and moulded as described in Example 36. This 1 mm thick sheet was then heated to 380° C. and shaped against various cold surfaces including:
1 a right-angle,
2 a cylindrical surface having a radius of curvature of 25 mm,
3 a spherical surface having a radius of curvature of 15 mm.

In the case of 1 and 2 good conformation was obtained. For the double curvature good conformation was obtained up to a solid angle of 60° subtended from the centre of the sphere (this is similar to the experience of Example 39 but at a tighter radius of curvature relative to the thickness of the sheet).

Most large structures will require only gentle double curvature but for tight curvature narrower weaves and in particular satin weaves are to be preferred to broad tabby weaves following general experience of the weaving industry.

EXAMPLE 41

A piece of material 40 mm square was woven (tabby weave) from tapes 2 mm wide and 0.1 mm thick. The formability of this material sheet was compared with that of the broad tape weave described in Example 35. The narrower tapes allowed easier conformation to shape changes. Moulded sheets forced from these two weaves appeared superficially similar in properties.

It is likely that in order to make use of conventional weaving technology narrow tapes will be employed in practice.

EXAMPLE 42

An attempt was made to lay up the tapes formed in Example 32 to give a multi-layer composite where each layer had a different orientation. Because the tapes, as formed, have no "tack" at room temperature there was a tendency for the layers to move relative to one another during the placement and moulding operation so that the fibres were not oriented in the designed configuration in the final moulding. This problem was partly overcome by tacking the layers together locally with a soldering iron. When formed in this way the sheets had to be moulded with side-wall constraint to avoid the fibres flowing sideways and disrupting the designed orientation pattern.

By contrast woven sheets were convenient and easy to handle and could be moulded without side-wall constraint because the interlocking weave itself prevents lateral movement of the fibres. The ability to form a preferred sheet without side-wall constraint is of especial advantage when considering the manufacture of continuous sheets by processes such as double-band pressing.

EXAMPLE 43

Woven sheets according to Example 35 were layed up and moulded to give sheets of different thickness in which each layer was at +45° to the layer above and below it. The impact behaviour of these sheets was determined using the instrumented falling weight impact test.

| No. of layers | Thickness mm | Impact energy Initiation J | Failure J |
|---|---|---|---|
| 1 | 0.25 | 0.29 | 0.78 |
| 3 | 0.79 | 1.04 | 3.0 |
| 5 | 1.19 | 2.2 | 5.4 |
| 9 | 1.88 | 4.8 | 10.9 |
| 18 | 2.88 | 8.1 | 23.5 |

EXAMPLE 44

Following the procedure of Example 32 tapes were prepared from polyether sulphone 'Victrex' 200P and carbon fibre (Courtaulds XAS, N. size). This polymer has a melt viscosity of 800 Ns/m$^2$ at 350° C. and 100 Ns/m$^2$ at 400° C. The spreaders were controlled at about 370° to 380° C. and the haul-off run at 0.2 m/minute. Because of the high viscosity of this resin the tapes were less well wetted than those described in Example 32. The resin content was increased slightly so that the final tape contained 50% by weight of carbon fibre and 50% by weight of resin.

Samples were moulded as described in Example 33 to give uniaxially oriented sheets having the following properties:

| | |
|---|---|
| Flexural modulus | 60 GN/m$^2$ |
| Flexural strength | 500 MN/m$^2$ |
| Transverse flexural strength | 20 MN/m$^2$ |

-continued

| | |
|---|---|
| Interlaminar shear strength | 26 MN/m$^2$ |

Tapes were then woven and layed up and moulded according to Examples 35 and 36 to give sheets approximately 1 mm thick having the following properties.

| | |
|---|---|
| Flexural stiffness (maximum) | 24 GN/m$^2$ |
| Flexural stiffness (minimum) | 21 GN/m$^2$ |
| Impact energy (initiation) | 2.9 (0.3) J |
| Impact energy (failure) | 7.1 (0.3) J |

(standard deviation in parentheses)

The broken through sheets were remoulded and retested taking care to impact the samples on the same spot as the original impact damage.

The flexural stiffness of the remoulded sheet was 10% lower than that of the original sheet while the impact resistance was reduced to 60% of the original value.

EXAMPLE 45

Polyethersulphone having a melt viscosity at 350° C. of 8 Ns/m$^2$ was used to impregnate a tape of carbon fibre which had previously been sized with 5% by weight of polyethersulphone using a solution sizing process. This sample was impregnated by drawing it over four heated spreaders at 350° C. at a speed of 0.2 m/minute. The final composite contained 47% by weight of carbon fibre. Samples were moulded according to Example 30 and tested giving the following results:.

| | |
|---|---|
| Flexural modulus | 85 GN/m$^2$ |
| Flexural strength | 680 MN/m$^2$ |
| Interlaminar shear strength | 50 MN/m$^2$ |

It will be noted that while this sample was prepared from polymer of lower molecular weight than that used in Example 44 the properties of the composite are superior.

EXAMPLE 46

Glass rovings were impregnated with polyethylene terephthalate (melt viscosity 3 Ns/M$^2$ at 270° C.) using the procedure described in Example 32, but with the bars at 280° to 300° C. Up to 80% by weight of glass fibre could be satisfactorily incorporated to give good wetting. At 60% by weight of glass, line speeds of 5 m/minute were readily attained for tapes 0.1 mm thick.

EXAMPLE 47

Glass rovings were impregnated with polypropylene, having a melt viscosity at 270° C. of 10 Ms/M$^2$, using the same equipment as Example 32 except that the bars were maintained at 270° C. At 50% by weight of glass fibre a very well wetted tape 0.1 mm thick was obtained which was especially useful for overwrapping pipe and other sections made from polypropylene.

EXAMPLE 48

Carbon fibre ('Celion' 6K and 3K tows) were impregnated with a thermotropic polyester containing residues of hydroxynaphthoic acid, terephthalic acid and hydroquinone having a melt viscosity at 320° C. of 7 Ns/m$^2$. The equipment was the same as described in Example 32 except that the bars were maintained at 320° C. A tape 0.1 mm thick containing 62% by weight of carbon fibre was of good appearance.

EXAMPLE 49

Various pieces of scrap material produced from working Examples 32 to 38 including some material with excess resin were broken up and fed to a conventional screw extruder and compounded to form granules. The granules contained carbon fibres which were up to 0.25 mm long. These granules were injection moulded using conventional moulding technology under normal operating conditions for filled PEEK. The mouldings had the following properties by comparison with the best available commercial grade of carbon fibre filled PEEK prepared by conventional compounding operations:

| | Compounded scrap scrap | Best commercial grade |
|---|---|---|
| Wt % carbon fibre | 55 | 30 |
| Modulus | 32 GN/m$^2$ | 13 GN/m$^2$ |
| Tensile strength | 250 MN/m$^2$ | 190 MN/m$^2$ |
| Surface quality | Good | Good |

This Example illustrates that the product of this invention is capable of being converted to a product for conventional processing which is in some way superior to that available by present technology. Also the scrap from various long fibre operations such as sheet preparation, lamination, filament winding etc. can be reclaimed to give a high performance material. The characteristic of reclaimability is of great economic significance when working with expensive raw materials such as carbon fibre.

EXAMPLE 50

The optimum tensions in rovings when operating according to the method of Example 29 were determined by measuring the tension before impregnation and at the haul-off stage in an individual roving containing 6000 filaments (14 rovings were used in Example 29 and the operating tension will in practice be 14 times the values given below). The values quoted below were judged to be the minimum operation tension (Case 1) and the maximum operating tension (Case 2) for the particular rovings, polymer type and equipment used. With tension values below those of Case 1 there was a tendency for misalignment of fibres and splits in the tape produced. With tension values above those of Case 2 increased fibre attrition was observed with loose fibres accumulating on the band. For a different set of conditions (rovings, polymer type etc. the values obtained will be different but can be readily optimised to produce a good quality product.

| | Tension before impregnation | Haul-off tension |
|---|---|---|
| Case 1 | 0.14 kg | 2.4 kg |
| Case 2 | 0.37 kg | 3.8 kg |

We claim:

1. Pellets of reinforced thermoplastics material containing at least 30% by volume of parallel, aligned reinforcing filaments between 2 and 100 mm in length, the filaments extending through the length of the pellets, the pellets having been cut from a continuous reinforced product prepared by melt pultrusion and which pellets can be injection moulded into an article in which the fibres are present in the form of randomly dispersed individual filaments at least 50% by weight of the filaments of the pellets retaining a length of greater than 2 mm in the moulded article.

2. Pellets according to claim 1 in which the continuous fibre reinforced structure has been produced in a continuous process.

3. Pellets according to claim 1 in which the thermoplastic material has a melt viscosity of less than 30 Ns/M$^2$ at a temperature between the melting point and decomposition temperature of the material.

4. Pellets according to claim 3 in which the molecular weight of the thermoplastic material is increased either before or after chopping the continuous product into pellets.

5. Pellets according to claim 1 which can be injection moulded into articles in which at least 50% by weight of the fibres retain a length of at lest 3 mm.

6. Pellets according to claim 1 which have been cut from a continuous fibre reinforced structure in which the individual filaments of the structure have been wetted to the extent that the longitudinal flexural modulus of the structure as determined by ASTM D790-80 is at least 70% of the theoretically attainable flexural modulus.

7. Pellets which have been obtained by melt homogenising the product of either of claims 1 or 5, extruding the molten product and chopping the extrudate into pellets.

* * * * *

UNITED STATES PATENT AND TRADEMARK OFFICE
CERTIFICATE OF CORRECTION

PATENT NO. : Reexam. Certificate No. B1 5,019,450 (3038th)
DATED      : October 29, 1996
INVENTOR(S): Frederic N. Cogswell et al.

It is certified that error appears in the above-indentified patent and that said Letters Patent is hereby corrected as shown below:

On the title page, item [73], "Imperial Chemical Industries Plc, Millbank, London, England" should read --Kawasaki Chemical Holding Co., Inc., Wilmington, Delaware--; in claim 1, col. 1, line 35, "[molded]" should read --[moulded]--; in claim 5, col. 2, line 6, "[molded]" should read --[moulded]--; in claim 7, col. 2, lines 21-22, "by volume of parallel, aligned reinforcing filaments" should appear in italicized type; in claim 8, col. 2, line 31, "contiuous" should read --continuous--.

Signed and Sealed this

Fifteenth Day of April, 1997

*Attest:*

BRUCE LEHMAN

*Attesting Officer*       *Commissioner of Patents and Trademarks*

REEXAMINATION CERTIFICATE (3038th)

United States Patent [19]
Cogswell et al.

[11] B1 5,019,450
[45] Certificate Issued *Oct. 29, 1996

[54] FIBER REINFORCED COMPOSITIONS AND METHODS FOR PRODUCING SUCH COMPOSITIONS

[75] Inventors: Frederic N. Cogswell, Welwyn Garden City; David J. Hezzell, Biggleswade; Peter J. Williams, Barton-le-Clay, all of England

[73] Assignee: Imperial Chemical Industries Plc, Millbank, London, England

Reexamination Request:
No. 90/003,975, Sep. 25, 1995

Reexamination Certificate for:
Patent No.: 5,019,450
Issued: May 28, 1991
Appl. No.: 401,488
Filed: Aug. 30, 1989

[*] Notice: The portion of the term of this patent subsequent to Dec. 17, 2002, has been disclaimed.

Related U.S. Application Data

[63] Continuation of Ser. No. 133,237, Dec. 14, 1987, abandoned, which is a continuation of Ser. No. 804,114, Dec. 3, 1985, abandoned, which is a division of Ser. No. 537,713, Sep. 30, 1983, Pat. No. 4,559,262, which is a continuation of Ser. No. 341,186, Jan. 20, 1982, abandoned.

[30] Foreign Application Priority Data

| Jan. 21, 1981 | [GB] | United Kingdom | 8101821 |
| Jul. 28, 1981 | [GB] | United Kingdom | 8123160 |
| Nov. 17, 1981 | [GB] | United Kingdom | 8134597 |

[51] Int. Cl.⁶ ............................................. B32B 5/08
[52] U.S. Cl. ............................. 428/402; 428/294
[58] Field of Search .................... 428/372, 378, 428/364, 402

[56] References Cited

U.S. PATENT DOCUMENTS

| Re. 32,772 | 10/1988 | Hawley | 264/108 |
| 2,877,501 | 3/1959 | Bradt | 18/55 |
| 3,022,210 | 2/1962 | Phillips | 156/180 |
| 3,042,570 | 7/1962 | Bradt | 156/180 |
| 3,164,567 | 1/1965 | Maxwell et al. | 524/494 |
| 3,368,995 | 2/1968 | Furukawa | 260/40 |
| 3,742,106 | 6/1973 | Price | 264/131 |
| 3,822,177 | 7/1974 | Moked | 428/402 |
| 3,993,726 | 11/1976 | Moyer | 266/174 |
| 4,037,011 | 7/1977 | Hattori et al. | 428/402 |
| 4,058,581 | 11/1977 | Park | 264/136 |
| 4,559,262 | 12/1985 | Cogswell et al. | 428/407 |

FOREIGN PATENT DOCUMENTS

| 44-000457 | 1/1969 | Japan . |
| 46-004545 | 11/1971 | Japan . |
| 51-050358 | 5/1976 | Japan . |
| 52-112653 | 9/1977 | Japan . |
| 55-092740 | 7/1980 | Japan . |
| 56-005715 | 1/1981 | Japan . |
| 1167849 | 10/1969 | United Kingdom . |
| 1264432 | 2/1972 | United Kingdom . |

OTHER PUBLICATIONS

Meyer, "The 25th Annual Technical Conference, 1970 Reinforced Plastics/Composites Division," *The Society Of The Plastics Industry, Inc.* Pultrusion, Section 6A, pp. 1–8 (Dec. 1970).

Bader et al., "An Improved Method of Production for High Strength Fibre-Reinforced Thermoplastics" *Composites*, pp. 150–158 (Jul. 1973).

*Primary Examiner*—Alexander S. Thomas

[57] ABSTRACT

Fiber-reinforced structures comprising a thermoplastics polymer and containing at least 30% by volume of reinforcing filaments extending longitudinally of the structure which have been produced in a continuous process and which have exceptionally high stiffness. The exceptionally high stiffness results from thorough wetting of the reinforcing filaments by molten polymer in the continuous process. The thorough wetting gives rise to a product which can be further processed even in vigorous mixing processes such as injection moulding with surprisingly high retention of the fiber length in the fabricated article. The continuous processes for producing the reinforced structures employ thermoplastics polymers having lower melt viscosities than conventionally considered suitable for achieving satisfactory physical properties.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 3 is cancelled.

Claims 1, 2 and 4–7 are determined to be patentable as amended.

New claims 8–10 are added and determined to be patentable.

1. Pellets of reinforced [thermoplastics] *thermoplastic* material containing at least 30% by volume of parallel, aligned reinforcing filaments between 2 and 100 mm in length, the filaments extending through the length of the pellets, the pellets having been cut from a continuous reinforced product prepared by melt pultrusion *in which the filaments have been substantially completely wetted by a molten thermoplastic material*, and which pellets can be injection [moulded] *molded* into an article in which the [fibres] *filaments* are present in the form of randomly dispersed individual filaments at least 50% by weight of the filaments of the pellets retaining a length of greater than 2 mm in the [molded] *molded* article.

2. Pellets according to claim 1 in which the continuous [fibre] reinforced [structure] *product* has been produced in a continuous process.

4. Pellets according to claim [3] *1* in which the molecular weight of the thermoplastic material is increased either before or after chopping the continuous product into pellets.

5. Pellets according to claim 1 which can be injection [molded] *molded* into articles in which at least 50% by weight of the [fibres] *filaments* retain a length of at [lest] *least* 3 mm.

6. Pellets according to claim 1 which have been cut from a continuous [fibre] reinforced [structure] *product* in which the individual filaments of the [structure] *product* have been wetted to the extent that the longitudinal flexural modulus of the [structure] *product* as determined by ASTM D790-80 is at least 70% of the theoretically attainable flexural modulus.

7. Pellets which have been obtained by [melt homogenising the] *melting and homogenizing reclaimable pieces of a continuous reinforced* product *prepared by melt pultrusion in which the filaments have been substantially completely wetted by a molten thermoplastic material and containing at least 30% by volume of parallel, aligned reinforcing filaments* [of either of claims 1 or 5], extruding the molten *reclaimable pieces of* product and chopping the extrudate into pellets, *which pellets can be injection molded into an article in which the filaments are present in the form of randomly dispersed individual filaments at least 50% by weight of the filaments of the pellets retaining a length of greater than 2 mm in the molded article.*

*8. Pellets according to claim 1 in which the reinforcing filaments are contiuous glass filaments.*

*9. Pellets according to claim 1 in which the thermoplastic material comprises a polyamide.*

*10. Pellets according to claim 1 in which the thermoplastic material comprises polypropylene.*

\* \* \* \* \*